US009845544B2

(12) United States Patent
Floner et al.

(10) Patent No.: US 9,845,544 B2
(45) Date of Patent: Dec. 19, 2017

(54) METHOD FOR COATING THE SURFACE OF AN ORGANIC OR METALLIC MATERIAL WITH PARTICULAR ORGANIC COMPOUNDS BY MEANS OF A PULSED-CURRENT ELECTROCHEMICAL REDUCTION OF THE DIAZONIUM IONS OF SAID ORGANIC COMPOUNDS

(71) Applicants: UNIVERSITE DE RENNES I, Rennes (FR); CNRS—CENTRE NATIONAL DE LA RECHERCHE SCIENTIFIQUE, Paris (FR)

(72) Inventors: Didier Floner, Servon sur Vilaine (FR); Florence Geneste, Servon sur Vilaine (FR)

(73) Assignees: CNRS—CENTRE NATIONAL DE LA RECHERCHE SCIENTIFIQUE, Paris (FR); UNIVERSITE DE RENNES I, Rennes (IT)

( * ) Notice: Subject to any disclaimer, the term of this patent is extended or adjusted under 35 U.S.C. 154(b) by 249 days.

(21) Appl. No.: 14/646,943

(22) PCT Filed: Nov. 22, 2013

(86) PCT No.: PCT/EP2013/074517
§ 371 (c)(1),
(2) Date: May 22, 2015

(87) PCT Pub. No.: WO2014/079989
PCT Pub. Date: May 30, 2014

(65) Prior Publication Data
US 2015/0299885 A1    Oct. 22, 2015

(30) Foreign Application Priority Data
Nov. 26, 2012  (FR) ...................... 12 61240

(51) Int. Cl.
*C25D 5/18*    (2006.01)
*C25D 5/54*    (2006.01)
(Continued)

(52) U.S. Cl.
CPC ............. *C25D 5/18* (2013.01); *C09D 5/4488* (2013.01); *C25D 7/00* (2013.01); *C25D 9/02* (2013.01); *C25D 13/12* (2013.01); *C25D 13/18* (2013.01)

(58) Field of Classification Search
CPC .................................. C25D 5/18; C25D 9/02
See application file for complete search history.

(56) References Cited

U.S. PATENT DOCUMENTS 8,926,821 B2 * 1/2015 Lefloch ............... C25D 9/02
205/317
2004/0248428 A1 * 12/2004 Bureau ............... B05D 5/12
438/780
(Continued)

FOREIGN PATENT DOCUMENTS

FR    2761377 A1    10/1998
FR    2829046 A1    3/2003
(Continued)

OTHER PUBLICATIONS

English Translation of the International Search Report for PCT/EP2013/074517 dated Feb. 7, 2014.
(Continued)

*Primary Examiner* — Brian W Cohen
(74) *Attorney, Agent, or Firm* — Thomas Horstemeyer, LLP

(57) ABSTRACT

The invention relates to a method for coating an organic or metallic material by covalent grafting of at least one organic compound A having at least one aromatic group substituted with a diazonium function, on a surface of said material,
(Continued)

characterized in that the material is porous or fibrillar having a geometric surface area of at least 10 cm² of material, and in that said method includes a step of continuous imposition of a non-zero pulsed current in an intensiostatic mode on the surface of the material in order to electrochemically reduce the diazonium ion or ions. The invention further relates to the resulting composite materials and to the use of such materials for manufacturing electrodes.

17 Claims, 3 Drawing Sheets

(51) Int. Cl.
  *C25D 9/02* (2006.01)
  *C25D 13/12* (2006.01)
  *C25D 13/18* (2006.01)
  *C09D 5/44* (2006.01)
  *C25D 7/00* (2006.01)

(56) References Cited

U.S. PATENT DOCUMENTS

2007/0209943 A1* 9/2007 Bureau .................. C09D 5/24
                                                              205/317

2010/0003808 A1* 1/2010 Mevellec .............. H01L 21/312
                                                              438/469
2012/0000785 A1* 1/2012 Zahraoui .............. C25D 17/001
                                                              205/91

FOREIGN PATENT DOCUMENTS

| FR | 2846012 A1 | 4/2004 |
| FR | 2933425 A1 | 1/2010 |
| WO | 9213983 A1 | 8/1992 |
| WO | 0159178 A1 | 8/2001 |

OTHER PUBLICATIONS

English Translation of the Abstract for FR 2761377 A1 published Oct. 2, 1998.
English Translation of the Abstract for FR 2829046 A1 published Mar. 7, 2003.
English Translation of the Abstract for FR 2846012 A1 published Apr. 23, 2004.
English Translation of the Abstract for FR 2933425 A1 published Jan. 8, 2010.
Estelle Coulon et al: "Electrochemical Attachment of Organic Groups to Carbon Felt Surfaces", Langmuir, vol. 17, No. 22, May 10, 2001 (May 10, 2001), pp. 7102-7106, XP055080178, ISSN: 0743-7463, DOI: 10.1021/la010486c.
English Translation of the International Preliminary Report on Patentability for PCT/EP2013/074517 dated May 26, 2015.

* cited by examiner

1 ——— Reference solution without $O_2$
2 ——— Reduction of $O_2$ on glassy carbon
3 ——— Reduction of $O_2$ on modified glassy carbon ——— Reduction of $O_2$ on nickel
——— Reduction of $O_2$ on modified nickel

METHOD FOR COATING THE SURFACE OF AN ORGANIC OR METALLIC MATERIAL WITH PARTICULAR ORGANIC COMPOUNDS BY MEANS OF A PULSED-CURRENT ELECTROCHEMICAL REDUCTION OF THE DIAZONIUM IONS OF SAID ORGANIC COMPOUNDS

CROSS-REFERENCE TO RELATED APPLICATION

This application is the 35 U.S.C. §371 national stage application of PCT Application No. PCT/EP2013/074517, filed Nov. 22, 2013, which claims priority to and the benefit of, FR Patent Application No. 1261240, filed Nov. 26, 2012, both of which are herein incorporated by reference in their entirety.

1. FIELD OF THE INVENTION

The present invention relates to a method for the coating, with particular organic compounds, of the surface of an organic or metallic material such as a porous or fibrillar material having a large geometrical surface area, the coating being done by pulsed-current electrochemical reduction of the diazonium ions of said organic compounds, possibly formed in situ.

The invention also relates to composite materials thus obtained, and to the use of such materials for the manufacture of electrodes.

2. PRIOR ART

The covalent grafting of catalysts on the surface of organic or metallic materials is of particular interest in the energy field, especially for the production of fuel cells or molecular batteries. Numerous methods for obtaining this grafting have been devised.

There is for example the known document WO92/13983 that describes a method for functionalizing the surface of carbonaceous materials by electrochemical reduction of an aromatic diazonium salt. According to this technique, the carbonaceous material is put into contact with a solution of diazonium salt in an aprotic solvent. The carbonaceous material is then negatively polarized relative to an anode also in contact with the solution of diazonium salt. The reduction is done at controlled potential (potentiostatic mode) on plane surfaces of a moderately sized area (about 1 cm$^2$). However, this method cannot be used to obtain a homogeneous coating when the material to be coated is a 3D material and has a large geometrical surface area, i.e. an area greater than or equal to 10 cm$^2$.

There is also, known from the document WO01/59178, to modify the surface of a metallic material by grafting aromatic groups thereon by electrochemical reduction of an aromatic diazonium salt. According to this document, the metallic material is put into contact with a solution of diazonium salt in an aprotic or protic acid solvent. The metallic material then undergoes negative polarization relative to an anode also in contact with the solution of diazonium salt. The reduction can be done in intentiostatic or potentiostatic mode or by repetitive cyclic voltammetry. However, this method too cannot be used to obtain a homogeneous coating when the material to be coated is a volumetric material and has a large geometrical surface area. Indeed, voltammetry is first of all an analytical technique based on constantly varying the potential while at the same time controlling each value of the potential. In practice, it is applicable only to small surface areas of the order of 1 mm$^2$. Consequently, the greater the surface area is, the more heterogeneous is the potential. This technique is therefore not suited to the treatment of materials whose surface area is greater than 10 cm$^2$ because it cannot be used to obtain a homogeneous graft throughout the length of the fibers of the material.

More specifically, when 3D electrodes have a geometrical surface area greater than or equal to 10 cm$^2$, and especially greater than or equal to 100 cm$^2$, it becomes difficult to accurately control the potential at the surface of the material to be coated. This comes from the fact that it is difficult to homogeneously polarize a big surface area. This difficulty is chiefly related to the electrical conductivity of the surface. This problem is even more critical when the material is porous as is the case with fibrillar metal felts, of which the specific surface area developed in volume is of the order of 1 m$^2$ per gram of material. The potential varies not only on the surface of the material but also in depth. It is therefore very difficult to obtain a homogeneous graft of molecules on the surface of porous or fibrillar materials. Now, these materials are of great interest for the industrial-scale production of molecular cells and batteries because they possess a great specific surface area that is because of their porosity or the presence of fibers. At the same time, they limit the overall volume of the device that contains then.

It is therefore necessary, for purposes of industrial use, to surmount this limiting of the surface area of the materials to be treated.

Besides, all these techniques dictate the use of a reference electrode. Now, the use of such electrodes does not make possible to obtain a homogeneous coating of the materials when the geometrical surface area exceeds 10 cm$^2$. Indeed, the use of a reference electrode is justified by the control of the potential applied to the material in order to prevent any divergence from the desired value. This control of potential is done by measuring the difference in potential between the working electrode and the point closest to the reference electrode on the material on which the graft is made. Now, when this material is of weak or average conductivity, the potential beyond this point very swiftly diverges from the desired value, and makes any modification ineffective beyond this point or in the direct vicinity of this point.

Finally, the grafting of diazonium salts in hydro-organic medium requires the use of an acid medium, especially with a pH below 2. This high acidity spontaneously prompts the corrosion of the material if it is metallic and therefore its dissolution in cation form. This is thermodynamically expressed as follows: when the metal M is plunged into an aqueous solution, the corrosion reaction starts if the potential of the H$^+$/H$_2$ pair is greater than the potential of the M$^{n+}$/M ($E_{H^+/H2}^+ > E_{M^{n+}/M}$) pair at a given pH. This corrosion prevents efficient grafting of the molecules on the surface of the metal materials.

3. GOALS

The Invention is Aimed at Overcoming at Least One of the Above-Mentioned Drawbacks.

More specifically, it is a goal of the invention, in at least one embodiment, to propose a method for grafting molecules on the surface of organic or metallic materials, porous or fibrillar, the geometrical surface area of which is greater than or equal to 10 cm$^2$.

It is another goal of the invention, in at least one embodiment, to propose such a method that prevents or at least restricts the phenomenon of corrosion of metallic materials.

It is yet another goal of the invention, in at least one embodiment, to propose such a method that makes it possible to obtain a coating of such homogeneous materials.

It is also a goal of the invention to propose such a method is simple and inexpensive to implement.

4. SUMMARY OF THE INVENTION

The present invention relates to a method for coating an organic or metallic material by covalent grafting of at least one organic compound A, possessing at least one aromatic group substituted by a diazonium function, on a surface of said material.

According to the invention, said material is porous or fibrillar and has a geometrical surface area of at least 10 cm$^2$ of material; and the method comprises a step for the continuous imposition of a non-zero pulsed current in an intentiostatic mode on the surface of the material in order to electrochemically reduce the diazonium ion or ions.

Thus, the present invention relies on the novel and original principle according to which compounds of interest A, in the form of diazonium salts, are fixed by electro-grafting covalently on the surface of an organic or metallic material, porous or fibrillar with a large geometrical surface area. The electro-grafting method thus proposed makes it possible firstly to obtain a homogeneous coating on the surface of the material whose geometrical surface area is greater than or equal to 10 cm$^2$ and secondly to enable the processing of metallic materials.

As understood in the invention, porous materials have a porosity on their entire volume and not only on their surface. Unlike in the classic methods, the method of the invention can be implemented on materials a volume having such as fibrillar materials and not only on essentially plane materials.

More specifically, the use of the pulsed method employed according to the method of the invention allow to have better homogeneity of grafting on the surface of the material especially for materials having large surface areas to be covered, such as porous or fibrillar materials. Indeed, a pulsed current is characterized by times of current imposition during which the current is not zero and idle times during which the applied current is zero. For a non-zero current, the concentration of the compound A decreases according to the imposition time. This causes the compound A to decrease in the vicinity of the electrode. The idle times enable the natural diffusion of the species towards the electrode until the concentration of the initial solution is recovered.

The use of the pulsed method used according to the method of the invention also prevents or reduces the phenomenon of corrosion observed when the material to be coated is metallic or metalized. This is obtained through the continuous imposition of a reduction current polarizing the material to a potential lower than the corrosion potential. After grafting, the metallic material is protected by an organic film limiting corrosion phenomena. Thus, the method according to the invention can be implemented equally well on organic materials and on metallic materials, corrodible or non-corrodible. Contrary to present-day techniques, the method of the invention enables the processing of all types of materials. Indeed, the classic methods enable the processing of only non-corrodible, organic or metallic materials such as gold. More specifically, a phenomenon of corrosion is observed with present-day techniques especially the during electro-deposition. The implementing of a non-zero pulsed current prevents this phenomenon of corrosion. Thus, the method of the invention can also be implemented on corrodible metal materials.

The implementing of a pulsed current furthermore fosters the reaction of the grafting relative to the secondary reactions which can occur, namely:

the reduction of $H_3O^+$ into $H_2$, since the protons can come from the acid used to prepare the diazonium salt and/or from the aqueous medium serving to solubilize the nitrite ions;

the reduction of the nitrite ions; and the reduction of the organic medium.

Finally, the use of a pulsed method of imposed current rather than a method of controlled potential does away with the need to use a reference electrode during the step of the electrochemical reduction of diazonium salt. This characteristic enables especially the processing of bigger surfaces than these of the prior art.

Besides, the method of the invention is easy to implement and does not require the independent preparation of diazonium salts of the organic compounds to be grafted onto the surface of the material.

The term "covalent grafting" is understood to mean that a covalent bond is set up between the organic compound to be grafted and the surface of the organic material or metal material to be coated. More specifically, the bond is formed between the aromatic group of the organic compound and the surface of the material. When the material is metallic, the nature of the bond between the surface and the aromatic group of the organic compound that modifies it is a carbon-metal bond of a covalent type. The expression "carbon-metal" signifies a strong non-ionic bond obtained by overlapping of the carbon and metal orbitals. When the material is organic, the nature of the bond between the surface and the aromatic group of the organic compound, which modifies it, is a covalent type carbon-carbon bond.

The method according to the invention comprises at least two steps a) and b).

The first step a) corresponds to the preparation of a grafting composition. Preferably, the graft composition is prepared in situ, i.e. in the same medium in which the electro-reduction reaction takes place. The grafting composition then comprises, in an appropriate medium, at least one organic compound possessing at least one aromatic group substituted by a diazonium function. This organic compound can be represented by the formula $A-N_2^+$, in which A is an organic compound comprising at least one acrylic group on which the group $N_2^+$ is substituted. The diazonium ion $A-N_2^+$ can be prepared for example by diazotization from nitrite $NO_2^-$ and an amine compound $A-NH_2$ in which A is as defined here above, in an acid medium. The reaction can be written as follows:

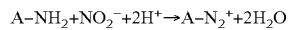

$$A-NH_2 + NO_2^- + 2H^+ \rightarrow A-N_2^+ + 2H_2O$$

Preferably, the catalyst concentration varies between $5 \cdot 10^{-4}$ mol/L and $10^{-2}$ mol/L. Catalyst concentrations below $5 \cdot 10^{-4}$ mol/L would be insufficient to obtain efficient grafting. On the contrary, diazonium salts in a concentration of over $10^{-2}$ mol/L would be insoluble. Similarly, the concentration in acid is preferably from $10^{-3}$ mol/L to $10^{-1}$ mol/L and the concentration in nitrite is preferably from $10^{-3}$ mol/L to $10^{-1}$ mol/L.

However, it is preferable for the concentration in nitrite to be 2.5 times greater than the concentration in catalyst A and the concentration in proton to be five times greater than the concentration in catalyst A.

The second step b) corresponds to the covalent grafting achieved by electrochemical reduction of the diazonium ion of the organic compound formed in situ. The radical $A^{\bullet}$ formed reacts immediately with the surface of the material carried to a cathode electrical potential. The mechanism implemented is the following:

$$A-N_2^+ + e^- \rightarrow A^{\bullet} + N_2$$

$A^{\bullet}$+surface of the material→A–surface of the material

Finally, the organic compound A is covalently bonded to the surface of the material. Concretely, the reduction takes place at the level of the cathode of an electrolyzer.

In an electrolyzer, the term "anode" is applied to the electrode that is connected to the positive terminal of the external generator and where the oxidation reaction occurs; and the term "cathode" is applied to the electrode that is linked to the negative terminal of the external generator and is where the reduction reaction occurs.

The cathode of the electrolyzer used is coated with or constituted by an organic or metallic material to be coated. At the end of the step b), the surface of the material is entirely and homogeneously covered with the organic compound A.

The choice of the organic compound A depends especially on the final use of the material obtained by the method according to the invention. In particular, the organic compound used can have a catalytic or a complexing activity with respect to the cations belonging to the transition metals (block d of the periodic table), the elements belonging the columns 1 (alkalines) and 2 (alkaline earths) of the periodic table and to the elements belonging to the lanthanide family. The catalytic activity remains preserved even after grafting on the material via the method according to the invention.

In one advantageous embodiment of the method according to the invention, the step of imposition of a pulsed non-zero current is carried out in successive cycles, each cycle comprising:
- a grafting phase with a duration $\Delta t_1$ during which the intensity of the current ($i_1$) applied is chosen so as to polarize the surface of the material to a potential $E_1$ enabling the reduction of the diazonium salt and the grafting of the aromatic group, substituted by said diazonium salt, on the surface of said material for a non-zero duration of imposition $\Delta t_1$, and
- an idle phase of a duration $\Delta t_2$ during which the intensity of the current applied ($i_2$) is smaller than the intensity $i_1$, for a non-zero idle duration $\Delta t_2$.

This method is particularly advantageous for the homogeneous coating of plane porous or fibrillar materials having a surface area greater than or equal to 10 cm$^2$.

The number of cycles is chosen preferably so as to obtain a complete overlapping of the organic or metallic material. In general, the method according to the invention comprises a repetition of ten cycles.

The choice of the intensity imposed $i_1$ and the duration of imposition $\Delta t_1$ favors the grafting reaction as compared with the other rival reactions.

Preferably, the value of the intensity $i_1$ is given in amperes by the following relationship:

$$i_1 = k \times m,$$

where:
m=the mass of organic or metallic material in grams;
k is a constant equal to 2 amperes per gram of metallic material and equal to 5 amperes per gram of organic material.

Advantageously, the value of the intensity $i_2$ is chosen so that it is lower than or equal to 0.05 times the value of the intensity $i_1$. When the material is organic, $i_1$ is zero.

Preferably, $i_2$ is different from zero when the material is metallic but $i_2$ is zero when the material is a graphite felt.

In one preferred embodiment of the invention, the duration of the imposition $\Delta t_1$ is chosen so as to satisfy the following relationship:

$$\Delta t_1 = k_t \times t_b,$$

in which:
$k_t = (A)/C_{min}$, where (A) represents the concentration of the organic compound A in moles per liter and $C_{min}$ represents the minimum concentration in diazonium ions.

$t_b$ represents a value constant in time.

Preferably, $t_b$ is equal to at least 100 microseconds and preferably equal to 500 microseconds when A is a phthalocyanine.

Preferably, the minimum concentration in diazonium ions $C_{min}$ ranges from $5.10^{-4}$ mol/L and $10^{-2}$ mol/L, and more preferably $C_{min}$ is equal to $5.10^{-4}$ mol/L.

The duration $\Delta t_2$ is chosen so as to enable a return of concentration in organic compounds at the electrode. In one advantageous embodiment, the duration of imposition $\Delta t_1$ ranges from 100 microseconds to 30 seconds, and preferably from 0.5 seconds to 10 seconds and/or the duration of the idle time $\Delta t_2$ ranges from 1 second to 5 minutes.

Preferably, the duration of the idle time $\Delta t_2$ is ten times greater to the time of imposition of the current $\Delta t_1$.

The method is done according to a stationary mode, i.e. with a fixed bed between the material to be modified and a counter-electrode. Preferably, the counter-electrode is made of graphite.

Advantageously, the organic compound A is chosen from the molecules that are insoluble or nearly soluble in water, comprising at least one aryl amine function. In particular, the organic compound A is chosen from the macrocyclic hydrocarbon or heteroatomic molecules each comprising one or more, preferably four benzene rings condensed with a mono- or poly-azolic ring, said mono- or poly-azolic ring being bonded to one another by a mono-atomic bridge chosen from the following groups: amine, imine (—N═), methylene (—CH$_2$—), or methine (—CH═).

More preferably, the organic compound A is chosen from the macrocyclic catalysts having a metal centre at the centre of the molecule and belonging to the phtalocyanine, porphyrine, calixarene, crown ether and cyclopeptide families.

The term "macrocycle" is understood to mean a cyclic macromolecule in which there is a cavity, this cavity possibly being vacant or occupied by an ion, an atom or another molecule. Among the macrocycles, the invention preferably uses organometallic macrocycles, i.e. a macromolecule whose cavity is occupied by a metal cation.

Advantageously, the appropriate medium comprises a protic solvent, an aprotic solvent and a supporting electrolyte necessary to carry out the electrochemical reduction.

More preferably, the aprotic solvent represents at least 90% by volume of the medium and in an even more preferably, the aprotic solvent represents at least 98% by volume of the medium.

The term "appropriate medium" is understood to mean any medium capable of solubilizing the organic compounds to be grafted to the surface on the material and the reagents needed to prepare the diazonium ions of said organic compounds such as the nitrite ions, in the operational conditions of the method according to the invention (namely atmospheric pressure, temperature at 25° C.). In particular, said appropriate medium is chosen so as to solubilize a maximum of organic compounds. The appropriate medium is such that it provides a concentration in organic compounds of up to $5.10^{-4}$ mol/L, and preferably varying from $5.10^{-4}$ mol/L to $10^{-2}$ mol/L at 25° C.

Preferably, the concentration in nitrite and in acid is at least two times higher than the concentration in amine compound $A\text{-}NH_2$. In an equally preferably manner, the concentration in proton is at least five times greater than the concentration in amine compound $A\text{-}NH_2$.

As a protic solvent, we can use water. The preferred protic solvent is water acidified by various strong acids such as sulfuric acid $H_2SO_4$, hydrochloric acid HCl or fluoroboric acid $HBF_4$.

As an aprotic solvent, we can cite the polar organic solvents such as dimethylformamide (DMF), acetonitrile, dimethylsulfoxide (DMSO). The preferred aprotic solvent is dimethylformamide.

As an example of an electrolyte support appropriate for implementing the invention, we may cite for example an alkaline tetrafluoroborate salt ($NaBF_4$), a quaternary or alkaline ammonium salt such as tetrafluoroborate, perfluorate, lithium or sodium or tetraalkylammonium hexafluorophosphate. Preferably, the salt used is an alkaline tetrafluoroborate salt ($NaBF_4$). Indeed, this salt is dissolved in DMF and in water. The mixture+water+$NaBF_4$ then become a conductive medium. In addition, this salt inexpensive and the anion $BF_4^-$ stabilizes the diazonium salt formed through an interaction between the positive charge of the diazonium salt and the anion. When the alkaline tetrafluoroborate salt is used as a supporting electrolyte, his concentration ranges from 0.1 mol/L to 0.5 mol/L and is preferably equal to 0.25 mol/L.

Preferably, the appropriate medium is a mixture of organic solvent and water in a volumic ratio of 90/10.

When the organic compound to be grafted is a phtalocyanine, the medium advantageously chosen is a DMF/water mixture in a 90/10 volumic ratio. The DMF solubilizes the organic compounds and the corresponding diazonium ions. The aqueous part of the mixture provides a sufficient reactivity of the nitrite ions to form the diazonium ions of the phtalocyanine. This mixture therefore provides an optimal concentration of $10^{-2}$ mol/L in dissolved phtalocyanines while at the same time retaining sufficient reactivity of the nitrite ions to form the diazonium ions of the phtalocyanine.

When the diazonium ions of the organic compound A are formed in situ by diazotization of nitrites in an acid medium, the grafting composition used in the method according to the invention comprises at least one nitrite and at least one acid.

The material to be coated by the method according to the invention can be organic or metallic. In particular, the material used is a material with a large specific surface area such as a porous or fibrillar material. The metallic material to be coated by the method according to the invention can be corrodible or non-corrodible.

In one preferred embodiment, the organic material can be chosen from foams, felts, the superimposition of fabrics, preferably carbon fiber felts and graphite fiber felts.

The material preferably takes the form of a plate. The geometrical surface area of the plate generally exceeds 10 $cm^2$. The thickness of the plate varies preferably from 0.1 to 12 mm.

When the porosity of the material is measurable, the material preferably has a maximum porosity of 90%.

By way of graphite fiber felts that can be used, we can cite those commercially distributed by the companies Mersen or VEOLIA. There are two available thicknesses on sale: 12 mm commercially distributed by the firm Mersen under the reference RVG 4000 and 6 mm corresponding to RVG 2000. Apart from the thickness, these materials are exactly identical. These felts are constituted by an enmeshing of graphite fibers. The very high porosity of felt is hard to quantify and corresponds more to inter-fiber spaces of varying sizes rather than to pores of well-defined diameters.

The apparent surface area evaluated by the firm Mersen (by the method known as the B.E.T. method) is 0.7 $m^2.g^{-1}$. The overall appearance of each fiber, the average diameter of which ranges from 20 to 25 microns, is very homogeneous. These fibers whose manufacture is proper to Mersen are obtained by pyrolysis of an acrylic-based polymer.

The felts proposed by the firm VEOLIA are also commercially distributed in rolls, but with a maximum thickness of 0.3 cm. One of the felts commercially distributed by VEOLIA is characterized by a very great specific surface area of 1200 $m^2.g^{-1}$, measured according to VEOLIA by the B.E.T. method. This corresponds to a surface area about 1700 times greater than that of Mersen graphite felts. This can be explained by the fact that the mean diameter of the fibers is small, about 10 microns, and that the density in fibers is high.

In one advantageous variant, the method according to the invention furthermore comprises a preliminary step of metallization of the organic material by electrodeposition of at least one metal, preferably done in situ, before the implementation of the method according to the invention.

The metallization of the organic material can therefore be done upstream to the method according to the invention, for example by methods of preparation described in the patent applications FR0213034, FR2846012 and FR1155040.

Preferably, the material is a metallic material that has a standard potential measured by a standard hydrogen electrode at 25° C. lower than zero. This metallic material is chosen from tin, indium, molybdenum, gallium, vanadium, nickel, cobalt, thallium, cadmium, iron, bismuth, chromium, zinc, preferably nickel, cobalt and copper.

Among all materials that can be used in the method according to the invention, the material is preferably chosen from among carbon fiber felts and metalized carbon fiber felts or better still among graphite fiber felts and metalized graphite fiber felts.

To realize the electrochemical reduction of the diazonium ion of the organic compound to be grafted, it is possible to use any conventional such as those commonly used to carry out electrodeposition. The electrolyzer generally used is formed by an electrochemical cell provided with two electrodes. The electrodes are connected to the terminals of an electrical current generator and each of them bathes in an appropriate conductive medium. The nature of the appropriate medium is as defined here above. Thus, it is not necessary to design devices specifically dedicated to implementing the method according to the invention.

The present invention also pertains to an organic or metallic material, porous or fibrillar having a geometrical surface area of at least 10 $cm^2$ and coated according to the method of the invention. The present invention relates especially to an electrochemical electrode coated with or formed by such a material. In particular, the fibrillar materials grafted by catalysts according to the method of the invention are particularly interesting in the development of circulating electrolyte cells/batteries.

The catalytic material obtained has the following qualities:
- lightness because the addition of the catalyst does not change the mass of the supporting material,
- flexibility because the addition of the catalyst does not make the material rigid. It can therefore be mechanically put into different shapes without being degraded.
- high electrical conductivity of the material, especially if the supporting material is a felt pre-metallized with nickel.
- homogeneous dispersion of the catalyst throughout the surface of the material.

The thickness of the layer is equivalent at least to the thickness of a molecular monolayer. This corresponds in principle to the size of the molecule used. If the electrolysis time is excessively great, this can lead to the formation of multiple layers. An excessively high stack of molecules (catalysts) leads to passivation of the material. To prevent this phenomenon, it is necessary to achieve a carry out a maximum of ten cycles of electrolysis where one cycle corresponds to the time: $t(electrolysis) = \Delta t_1 + \Delta t_2$.

In conclusion: the catalytic activity of these materials is optimal throughout the surface. Through the 3D structure of these materials, the response of all the catalysts is very high for a small volume of material.

5. LIST OF FIGURES

Other features and advantages of the invention shall appear more clearly from the following description of a preferred embodiment, given by way of a simple illustrative and non-exhaustive example, and from the appended drawings, of which:

6. EXAMPLES OF EMBODIMENTS OF THE INVENTION

Figure 1:
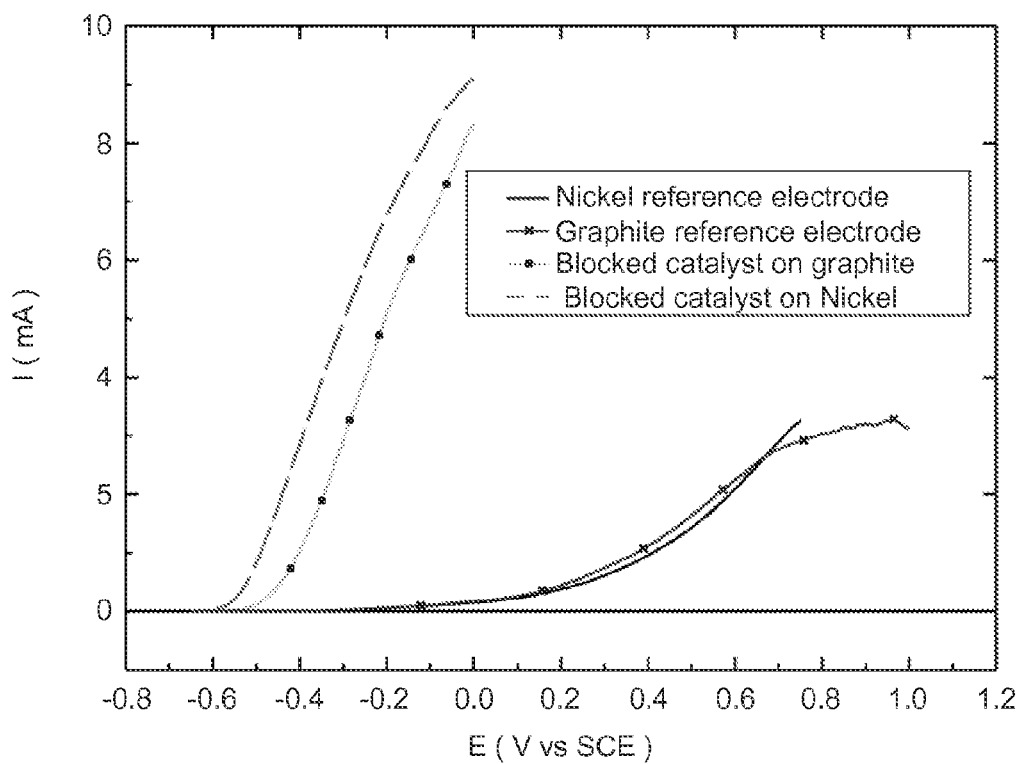
FIG. 1 is a graph illustrating the results of the oxidation of hydrazine on graphite and on nickel in the absence and in the presence of catalyst.

The general principle of the invention relies on the use of a non-zero pulsed current, with imposed current, enabling the grafting of diazonium salts in an acid hydro-organic medium on organic or metallic materials, porous or fibrillar, the specific surface area of which is at least equal to 10 cm². The following examples serve to illustrate the invention without however being exhaustive in character.

6.1 Demonstrating the Efficiency of the Grafting of Catalysts on Organic and Metallic Materials A series of experiments was conducted to graft phtalocyanines derivatives on organic material such as graphite or metallic materials such as nickel, and to test the efficiency of the grafting by measuring the catalytic activity of the compounds once grafted relative to oxidation of a hydrazine.

Hydrazine is a reducing agent that oxidizes according to the following diagram:

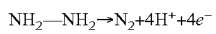

The tested derivatives of phtalocyanines are synthesized in the laboratory and represented here below. The core $Mn^+$ represents a metallic ion, preferably $Co^{2+}$ or $Fe^{2+}$.

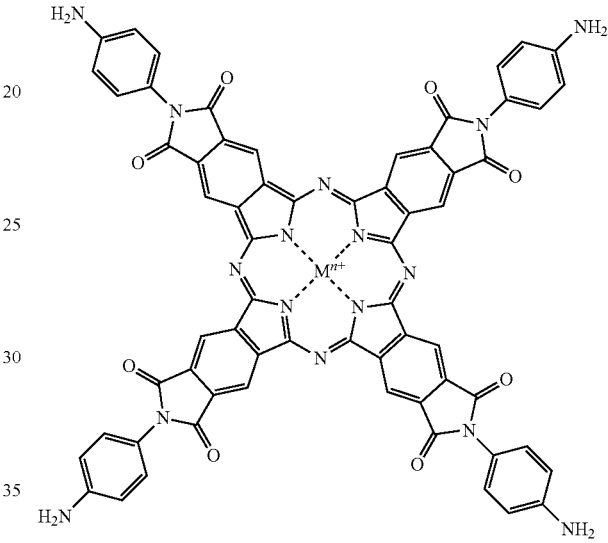

The choice of using these compounds can be explained by the fact that it was observed that the catalytic activity of the phtalocyanine derivatives relative to the oxidation of hydrazine was optimum when the metal inserted into the macrocycle is $Co^{2+}$ or $Fe^{2+}$.

In addition, these organic compounds have four chains each terminated by an aniline type amine function. For each compound therefore, there are four possibilities of anchoring by electrochemical reduction of the corresponding diazonium ions on the surface of a material.

The method of coating according to the invention was implemented according to the following operational protocol. The protocol uses a felt metalized with nickel. The felt presents a spherical with a diameter of 10 cm, a thickness of 3 mm and a mass of 5.5 g. This felt is immersed in one liter of a phtalocyanine solution with a concentration equal to $10^{-3}$ mol/L.

It must be noted that a phtalocyanine concentration of $10^{-3}$ mol/L is equivalent to an aniline concentration of $4.10^{-3}$ mol/L. The parameters implemented are the following:

$i_1 = 11$ A
$k_f = 8$
$\Delta t_1 = 4$ s
$i_2 = 0.55$ A
$\Delta t_2 = 40$ s

Composition of the Grafting Solution:

The solutions A and B are prepared separately and then mixed in the following percentages by volume: 90% of solution A and 10% of solution B. The composition of each solution is indicated here below:

a) solution A: 900 ml of DMF in which 1.2 g of phtalocyanine (molar mass=1206 g·mol$^{-1}$) is dissolved to obtain a final concentration of $10^{-3}$ mol·L$^{-1}$, and 27.5 g of NaBF$_4$ (molar mass=110 g·mol$^{-1}$) is dissolved to obtain a final concentration of 0.25 mol·L$^{-1}$.

b) solution B: 100 ml of an aqueous solution mixed with 900 ml of DMF two times:
- first addition of 80 ml in a solution of sodium nitrite at 0.125 mol·L$^{-1}$ for a final concentration, after dilution in DMF, that is equal to $10^{-2}$ mol·L$^{-1}$;
- second addition of 20 ml of a solution of a strong acid at 1 mol·L$^{-1}$ for a final concentration, after dilution in DMF, that is equal to 0.2 mol·L$^{-1}$.

When the second addition is made, a waiting time of 10 min is necessary before starting the electrolysis. This waiting time is necessary because the synthesis in situ of diazonium salts was not instantaneous.

FIG. 1 resembles a series of experiments firstly confirming that the catalysts once grafted do not lose their activity and secondly showing the efficiency of the catalysts and consequently the success of the covalent grafting of the phthalocyanines on the two materials (graphite and nickel). The analyses are made on samples of electrodes with a geometrical surface area of about 0.1 cm$^2$. The intensity I is expressed in milliamperes (mA) and the potential E is expressed in volts (V) against a saturated calomel electrode (SCE).

The curves of the graph of FIG. 1 represent the direct oxidation of the hydrazine on graphite and on nickel as well as the oxidation of the hydrazine after the catalyst has been grafted on to the surface of the materials. It must be noted that a better result is obtained with blocked catalysts on nickel. This better result is expressed by a shift in the curve, towards the negative potentials, of approximately 150 mV relative to the curve obtained with graphite modified by the catalyst.

Thus, it has been shown that the method according to the invention enables the efficient grafting of the phthalocyanine catalysts on to graphite and nickel.

6.2 Demonstrating the Homogeneity of the Grafting of Catalysts on Organic and Metallic Material.

Figure 2:
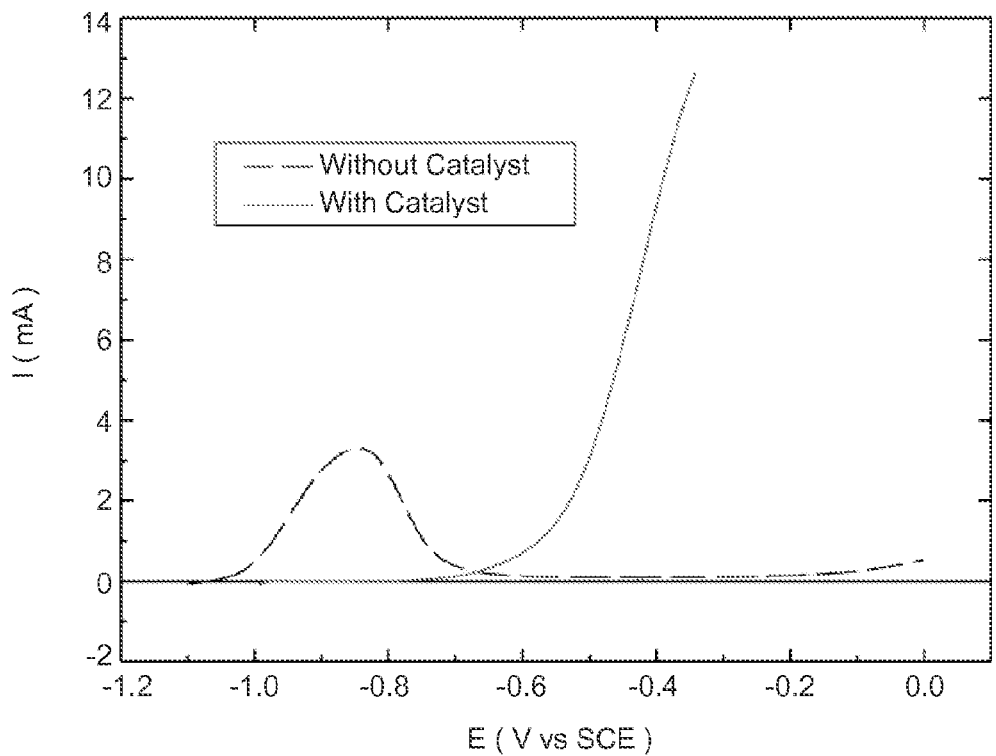
FIG. 2 is a graph presenting the results of the oxidation of hydrazine on nickel in the absence and in the presence of catalysts.

The homogeneity of the grafting on nickel was demonstrated by measuring the anti-corrosive properties obtained after grafting. It is important to obtain the most homogeneous coating possible because the phenomenon of corrosion occurs in zones not coated by the grafting. Hydrazine is a very strong complexing agent that prompts the corrosion of a metal, which is the case for nickel, FIG. 2. In the absence of a catalyst, nickel shows a domain of corrosion situated between −1.1 V and −0.6 V. This phenomenon is well known and appears because of the complexing capacity of hydrazine on nickel which considerably lowers the potential of corrosion. In the presence of the catalyst, the corrosion disappears. A surface modification also protects the metal.

Thus, it has been demonstrated that the method according to the invention enables a metallic material to be passivated homogeneously.

6.3 Reduction of Dioxygen O$_2$ in a Solution of Sodium Hydroxide at 1 mol/L

The reduction of dioxygen is implemented in fuel cells generally in a concentrated base medium. The reduction reaction corresponding to the positive pole of the cell is the following:

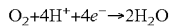

E°=1.23 V/SHE

Depending on the pH, the release of oxygen is related to the formula: $E_{O2/H2O}$=1.23−0.06 pH. As a consequence, in a solution with a pH=14, the release of dioxygen starts theoretically at 0.39 V/SHE. In practice, this value is never obtained and the best result is obtained on platinum with a reduction potential of the order of 0.1 V/SHE at pH=14.

Two series of experiments were conducted in order to compare the influence of the grafting on the reduction of dioxygen. For each experiment, the reduction of dioxygen in a highly basic medium was carried out by using either a non-modified electrode or the same electrode modified by the grafting of diazonium salts. Besides, two types of different materials were used: a glassy carbon electrode and a nickel electrode.

For these two electrodes, when they were modified, the phthalocyanine grafting solution was the same and had the following composition:
- cobalt phthalocyanine in a concentration 5.10$^{-4}$ mol·L$^{-1}$ in a solution of DMF containing NaBF$_4$ in a concentration of 0.5 mol·L$^{-1}$.
- 1% by volume of a solution of sodium nitrite at 1 mol·L$^{-1}$.
- 1% by volume of a solution of sulfuric acid at 0.5 mol·L$^{-1}$.

Figure 3:
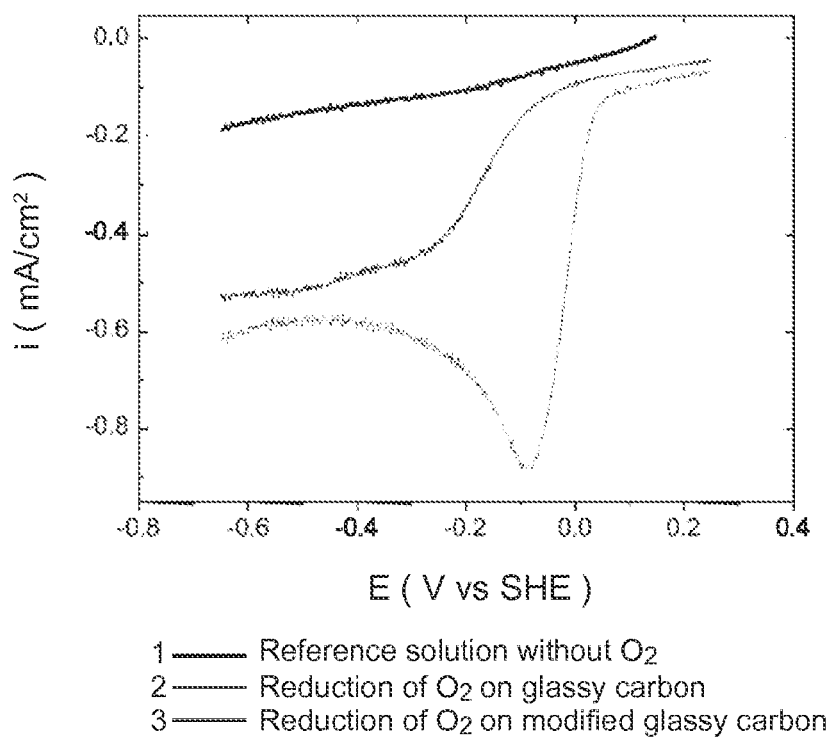
FIG. 3 is a graph illustrating the results of the reduction of dioxygen on glassy carbon.

As can be seen from FIG. 3, the grafting of phthalocyanines on the surface of the electrode improves the reduction of dioxygen as compared with the non-modified electrode. This improvement is characterized by a potential for starting reduction towards 0V/SHE and by a verticality of the signal which expresses a fast speed of electron transfer between O$_2$ and the cobalt phthalocyanine.

Figure 4:
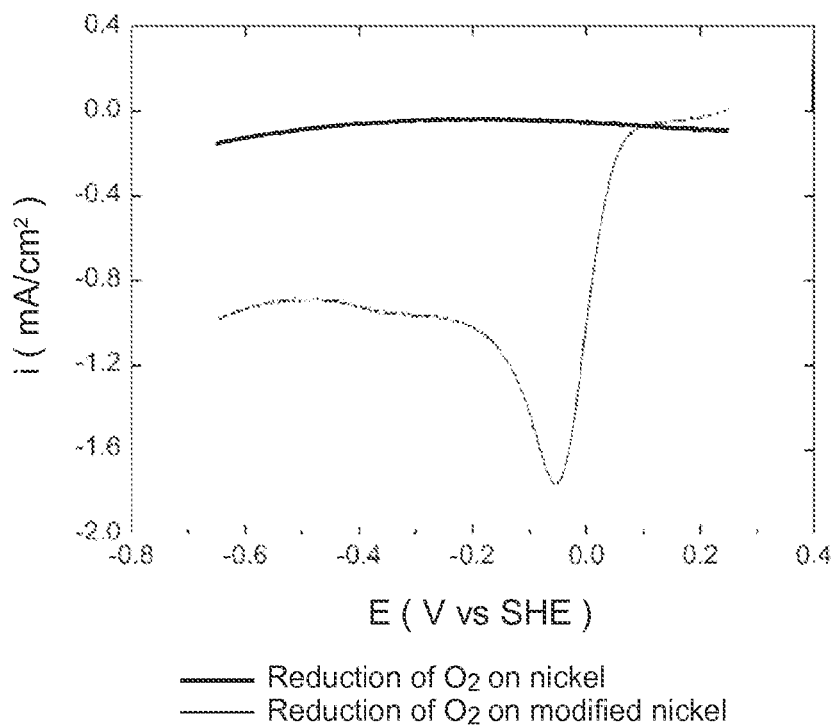
FIG. 4 is a graph illustrating the results of the reduction of dioxygen on a felt metalized with nickel.

By contrast, unlike in glassy carbon, the dioxygen is reduced with great difficulty on nickel. Indeed, as can be seen in FIG. 4, the reduction of O$_2$ on pure nickel does not appear in the potential domain represented. The reduction of the dioxygen becomes effective well below −0.6 V/SHE. The grafting of phthalocyanines on the surface of the nickel shows all its efficiency since the signal obtained is almost identical to the one obtained on glassy carbon (see FIG. 3). The signal has the same verticality with an increase of about 50 volts at the start of the signal.

Thus, the grafting of the catalysts is advantageous on carbon and very efficient on a metallic material such as nickel. This technique gives a metallic type electrode, of which the properties relative to the reduction of dioxygen are very close to platinum. Now platinum is particularly costly, the method according to the invention enables the production of low-cost catalysts capable of reducing dioxygen at a satisfactory potential. The catalytic material created can therefore be used as an electrode in fuel cells and batteries.

6.3. Supported Synthesis of Hydrogen Peroxide H$_2$O$_2$ by Electrolysis by Percolation.

The industrial synthesis of hydrogen peroxide is conventionally achieved by oxidation of 2-alkyl anthrahydroquinone (A) by dioxygen under heavy bubbling. This oxidation leads to the formation of 2-alkylanthraquinone (B) accompanied by a release of hydrogen peroxide. The 2-alkyl anthrahydroquinone (A) is regenerated by a reduction of 2-alkylanthraquinone (B) under a dihydrogen atmosphere. The step of reduction is usually catalyzed by a metal. This cycle is repeated successively for the industrial production of hydrogen peroxide and is represented here below.

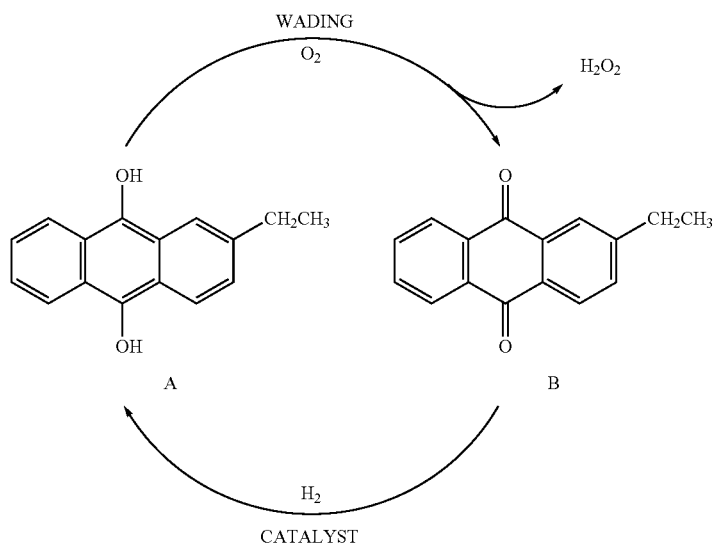

Through the method of the invention, it is now possible to propose an alternative method for the synthesis of hydrogen peroxide. In other words, the present invention is allows to carry out the industrial synthesis of hydrogen peroxide through electrolysis by percolation in which the compound (A) is blocked on a porous electrode. This method regenerates the molecule (A) electrochemically without having recourse to a dihydrogen atmosphere. More specifically, the 2-alkyl anthrahydroquinone is grafted on to an electrode. A second electrode has 2-aminoanthraquinone grafted on it, according to the method of the invention, and herein plays the role of a catalyst. The oxidation-reduction reaction between the two electrodes is represented here below:

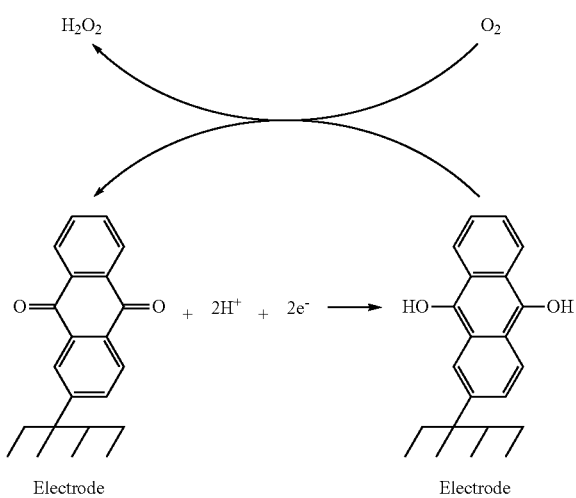 [SMILES: "H2O2" ; "O2" ; CCC(C)C(C)(CC)c1ccc2c(c1)C(=O)c1ccccc1C2=O ; CCC(C)C(C)(CC)c1ccc2c(O)c3ccccc3c(O)c2c1]

The diazonium salts are formed starting from the amine function in position 2 of the 2-aminoanthraquinone. The grafting composition is the following:

- 98% of DMF containing the 2-aminoanthraquinone at $10^{-3}$ mol·L$^{-1}$ and NaBF$_4$ at 0.25 mol·L−1.
- 1% of an aqueous solution of sodium nitrite with a concentration of 1 mol·L$^{-1}$.
- 1% of a solution of sulfuric acid with a concentration of 0.5 mol·L−1.

The electro-grafting process according to the invention was implemented on a nickel electrode at pH=7.

The electrochemical reduction of dioxygen (O$_2$) leads to the formation of hydrogen peroxide (H$_2$O$_2$) according to the reversible reaction (1):

$$O_2 + 2H^+ + 2e^- \rightarrow H_2O_2 \qquad (1)$$

E°=0.69 V/SHE.

On the transition metals, this reaction is kinetically slow, resulting in a small quantity of H$_2$O$_2$ formed. On noble metals and especially for platinum, the hydrogen peroxide once formed is in reduced majority in water according to the reaction (2):

$$H_2O_2 + 2H^+ + 2e^- \rightarrow 2H_2O \qquad (2)$$

E°=1.73 V/SHE.

The use of anthraquinone as a redox catalyst enables the quantitative and unique performance of the reaction (1) of electrochemical synthesis of hydrogen peroxide, and this can be done on all the conductive materials able of fixing the catalyst.

Figure 5:
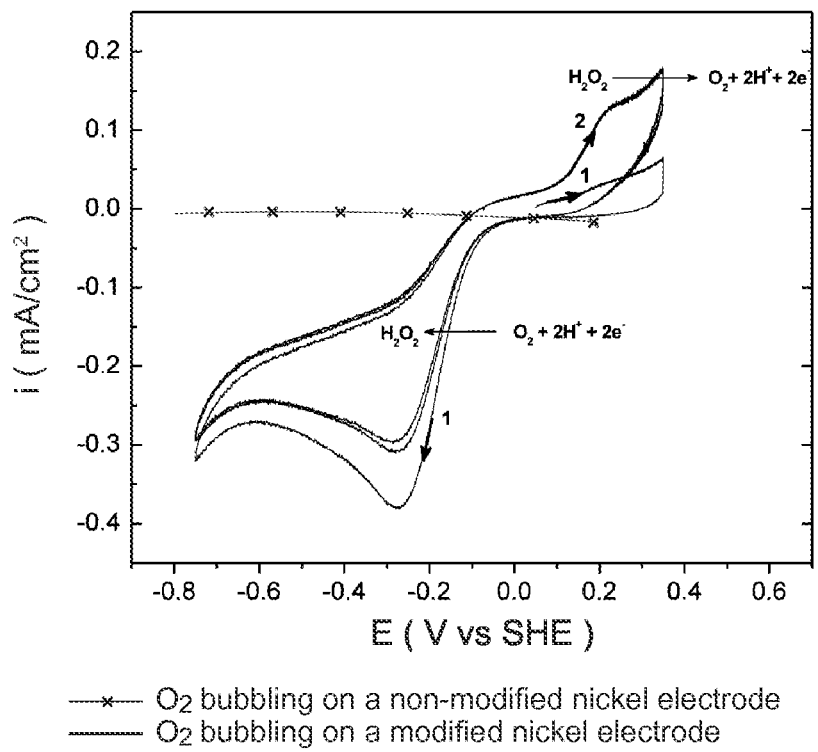
FIG. 5 is a graph presenting the results of the voltammetric analysis of the reduction of dioxygen into hydrogen peroxide.
Figure 6:
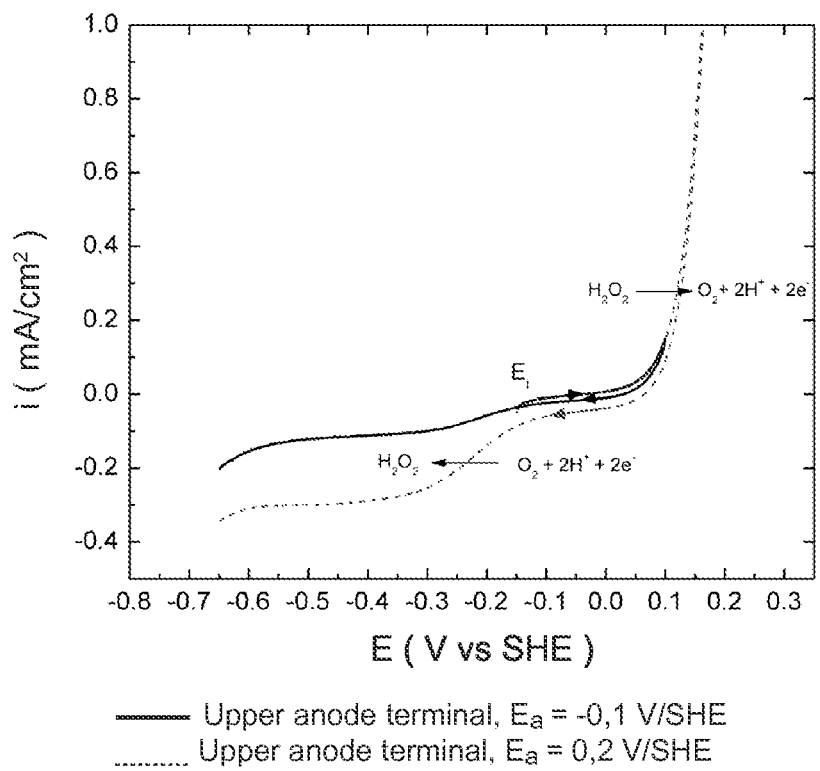
FIG. 6 is a graph illustrating the results of the voltammetric analysis of a solution of hydrogen peroxide by a nickel electrode modified by 2-aminoanthraquinone.

FIG. 5 gives an account of the working of the anthraquinone grafted on a nickel electrode. On non-modified nickel, the reduction of dioxygen is not effective. By contrast, in the presence of the grafted catalyst, the reduction of dioxygen appears. As soon as the second cycle starts, when the potential varies towards the anodic potentials, the oxidation of hydrogen peroxide formed on the electrode is resumed to be oxidized in dioxygen. The formation of hydrogen peroxide under bubbling of O$_2$ is confirmed by the analysis of a solution of hydrogen peroxide in which the modified nickel electrode is tested (see FIG. 6).

A variation of the potential is performed from an initial value (Ei=−0.15 V/SHE) towards a higher anodic value (Ea) followed by a return to a cathode potential Ec with a value −0.65 V/ESH. The anodic terminal (Ea) is in the domain of oxidation of the hydrogen peroxide. Thus, the higher the value of the anodic terminal is, the greater the quantity of dioxygen formed at the electrode is consequently, during the return cycle, the reduction of dioxygen formed at the electrode occurs and the intensity of the reduction current increases in parallel to that of the anodic terminal.

The method for synthesizing hydrogen peroxide developed from the method according to the invention has many advantages:

- there is no use of dihydrogen ($H_2$);
- there is no separation of the catalyst or catalysts, the solution of hydrogen peroxide being obtained at the output of the electrochemical cell;
- the degree of the hydrogen peroxide solution is directly a function of the control of the intensity of the current applied to the negative terminal;
- according to the support material used, the peroxide solution can be synthesized in an acid solution or else in a basic solution: the method is then easily adaptable;
- a part of the needed dioxygen for the working of the method is provided by the electrolysis system of and more specifically from the oxidation of water which takes place at the counter electrode (positive electrode); and
- anthraquinone is a stable molecule through its highly robust molecular structure and therefore, as a redox catalyst, possesses a very high life time.

The invention claimed is:

1. A method for coating an organic or metallic material by covalent grafting of at least one organic compound A, possessing at least one aromatic group substituted by a diazonium function, on a surface of said material, characterized in that said material is porous or fibrillar and has a geometrical surface area of at least 10 cm² of material; and the method of coating comprises a step of continuous imposition of a non-zero pulsed current in an intentiostatic mode on the surface of the material in order to electrochemically reduce the diazonium ion or ions, wherein the step of imposition of the non-zero pulsed current is carried out in successive cycles, each cycle comprising:
   - a grafting phase with a duration $\Delta t_1$ during which a first intensity of the non-zero pulsed current ($i_1$) applied is chosen so as to polarize the surface of the material to a potential $E_1$ enabling the reduction of the diazonium salt and the grafting of the aromatic group, substituted by said diazonium salt, on to the surface of said material for a non-zero duration of imposition $\Delta t_1$, and
   - an idle phase of a duration $\Delta t_2$ during which a second intensity of the non-zero pulsed current applied ($i_2$) is smaller than the first intensity of the non-zero pulsed current ($i_1$), for a non-zero idle duration $\Delta t_2$, wherein the second intensity of the non-zero pulsed current ($i_2$) is non-zero.

2. The method according to claim 1, characterized in that a value of the first intensity $i_1$ is given in amperes by the following relationship:

$$i_1 = k \times m,$$

where:
- m=mass of organic or metallic material in grams; and
- k=2 amperes per gram of metallic material and k=5 amperes per gram of organic material.

3. The method according to claim 1, characterized in that a value of the second intensity $i_2$ is lower than or equal to 0.05 times a value of the first intensity of the non-zero pulsed current ($i_1$).

4. The method according to claim 1, characterized in that the duration of imposition $\Delta t_1$ is given by the following relationship:

$$\Delta t_1 = k_t \times t_b,$$

in which:
- $k_t = (A)/C_{min}$, where (A) represents a concentration of the organic compound A in moles per liter and $C_{min}$ represents the minimum concentration in diazonium atoms, and
- $t_b$ represents a value constant in time.

5. The method according to claim 1, characterized in that the duration of imposition $\Delta t_1$ ranges from 100 microseconds to 30 seconds, the duration of the idle time $\Delta t_2$ ranges from 1 second to 5 minutes, or a combination of both.

6. The method according to claim 1, characterized in that the material is an organic material chosen from foams, felts, and superimposition of fabrics.

7. The method according to claim 6, characterized in that it comprises a step of metallization of the organic material by electrodeposition of at least one metal prior to the step of continuous imposition of the non-zero pulsed current.

8. The method according to claim 1, characterized in the material is a metallic material chosen from among the metals having a standard potential measured by a standard hydrogen electrode at 25° C. lower than zero.

9. The method according to claim 1, characterized in that the organic compound A is chosen from molecules that are insoluble or nearly soluble in water and comprise at least one arylamine function.

10. The method according to claim 9, wherein organic compound A is chosen from among the macrocyclic catalysts possessing a metal-centre at the centre of the molecule and belonging to the group consisting of: phtalocyanine, porphyrine, calixarene, crown ether and cyclopeptide families.

11. The method according to claim 1, characterized in that it is implemented in an appropriate medium comprising a protic solvent, an aprotic solvent and a supporting electrolyte.

12. The method according to claim 11, characterized in that the aprotic solvent is an organic solvent, in that the protic solvent is water and in that the appropriate medium is a mixture of organic solvent and water in a volume ratio of at least 90/10.

13. The method according to claim 5, characterized in that the duration of imposition $\Delta t_1$ ranges from 0.5 to 10 seconds.

14. The method according to claim 6, characterized in that the felt is selected from the group consisting of carbon fiber felts and graphite fiber felts.

15. The method according to claim 7, further comprising that the step of metallization of the organic material by electrodeposition of at least one metal is performed in situ.

16. The method according to claim 8, characterized in that the metallic material is selected from the group consisting of tin, indium, molybdenum, gallium, vanadium, nickel, cobalt, thallium, cadmium, iron, bismuth, chromium, zinc and copper.

17. The method according to claim 16, characterized in that the metallic material is selected from the group consisting of nickel, cobalt and copper.

* * * * *